(12) United States Patent
Barthe et al.

(10) Patent No.: US 9,464,008 B2
(45) Date of Patent: Oct. 11, 2016

(54) PROCESS FOR PREPARING AMMONIUM SULFATE NITRATE

(71) Applicant: Honeywell International Inc., Morristown, NJ (US)

(72) Inventors: Stephanie C. Barthe, Richmond, VA (US); James A. Kweeder, Chesterfield, VA (US); Maria A. Azimova, Richmond, VA (US); Raymond G. Wissinger, Midlothian, VA (US); Christopher B. Pace, Russellville, AL (US); Joshua H. McGill, Florence, AL (US); Keith D. Cochran, Killen, AL (US); Andrew J. Howes, Chesterfield, VA (US)

(73) Assignee: Honeywell International Inc., Morris Plains, NJ (US)

( * ) Notice: Subject to any disclaimer, the term of this patent is extended or adjusted under 35 U.S.C. 154(b) by 319 days.

(21) Appl. No.: 13/743,090

(22) Filed: Jan. 16, 2013

(65) Prior Publication Data

US 2013/0192323 A1 Aug. 1, 2013

Related U.S. Application Data

(60) Provisional application No. 61/593,627, filed on Feb. 1, 2012.

(51) Int. Cl.
*C05C 1/02* (2006.01)
*C05C 1/00* (2006.01)
*C01C 1/248* (2006.01)

(52) U.S. Cl.
CPC .............. *C05C 1/02* (2013.01); *C01C 1/248* (2013.01); *C05C 1/00* (2013.01)

(58) Field of Classification Search
CPC ......... C01B 17/96; C01C 1/24; C01C 1/245; C01C 1/246; C01G 1/10; C01D 5/06; C01D 5/08; C05C 1/00; C05C 3/00; C06B 31/28
USPC ........................ 71/59, 60; 423/388, 396, 397
See application file for complete search history.

(56) References Cited

U.S. PATENT DOCUMENTS 2,795,495 A * 6/1957 Schmatloch et al. ............. 71/59
3,726,660 A * 4/1973 Dreschel et al. .................. 71/37
3,852,055 A * 12/1974 Hawkes et al. ................... 71/59

(Continued)

FOREIGN PATENT DOCUMENTS

EP   1923376 A2   5/2000
EP   1595860 A2   11/2005

(Continued)

OTHER PUBLICATIONS

Honeywell Sulf-N® 26: A New Fertilizer for a New World, available at http://www.sulfn26.com/documents/Sulf-N_Fact_Sheet.pdf.*

(Continued)

*Primary Examiner* — Anthony J Zimmer
(74) *Attorney, Agent, or Firm* — Faegre Baker Daniels LLP (57) ABSTRACT

Ammonium sulfate nitrate double salts may be produced using a process that result in complete or nearly complete conversion to the 2:1 double salt. In some embodiments, the disclosure pertains to methods of controlling moisture content during the production process.

17 Claims, 4 Drawing Sheets

(56) References Cited

U.S. PATENT DOCUMENTS

| | | |
|---|---|---|
| 3,956,464 A | 5/1976 | Drechsel et al. |
| 3,964,893 A | 6/1976 | Everingham et al. |
| 4,268,490 A | 5/1981 | Neville |
| 4,512,793 A | 4/1985 | Harrison |
| 4,604,126 A * | 8/1986 | Moraillon ............ 71/34 |
| 6,361,720 B1 | 3/2002 | Highsmith |
| 6,454,828 B1 | 9/2002 | Lohry et al. |
| 6,689,181 B2 | 2/2004 | Highsmith et al. |
| 7,175,684 B1 | 2/2007 | Kweeder et al. |
| 7,985,393 B2 | 7/2011 | Smith |
| 8,075,660 B2 | 12/2011 | Kweeder et al. |
| 2002/0095966 A1 | 7/2002 | Highsmith et al. |
| 2007/0199357 A1 | 8/2007 | Kweeder et al. |
| 2009/0173124 A1 | 7/2009 | Kononov et al. |
| 2010/0047149 A1 | 2/2010 | Stevens et al. |
| 2010/0242556 A1 * | 9/2010 | Smith ............ 71/59 |
| 2012/0131972 A1 | 5/2012 | Kweeder et al. |

FOREIGN PATENT DOCUMENTS

| | | | |
|---|---|---|---|
| GB | 1259778 A | | 1/1972 |
| WO | WO02/06186 A1 | | 1/2002 |
| WO | 0240427 A2 | | 5/2002 |
| WO | 2010008987 A2 | | 1/2010 |
| WO | 2013116024 A1 | | 8/2013 |

OTHER PUBLICATIONS

The International Search Report mailed May 15, 2013 in International Application No. PCT/US2013/022373.

Ando et al., Compounds in Mixed Nitrate Fertilizers and their Behavior, Faculty of Science and Engineering, Chuo University,Tokyo, Dispatch number: 462216 (Accepted Apr. 5, 1974), pp. 1-15 with notation to Nippon Kagakukaishi, 1974, (9), p. 1617-1622.

Ando, "Increase in Weight and Degradation of Granulated Fertilizer Compounds Containing Nitrates and Sulfates", Sep. 23-27, 1974, LSMA Technical Meeting, Prague Czechoslovakia.

Bahl et al., The Ternary System. Ammonium Nitrate-Ammonium Sulphate-Water at 25°. Journal of the Indian Chemical Society, vol. XVIII (1941) pp. 307-308.

Extended European Search Report issued in EP Application No. 13742876.9, mailed Nov. 19, 2015, 7 pages.

* cited by examiner

PROCESS FOR PREPARING AMMONIUM SULFATE NITRATE

RELATED APPLICATION

This application claims the benefit of U.S. Provisional Application Ser. No. 61/593,627, filed Feb. 1, 2012 and entitled PROCESS FOR PREPARING AMMONIUM SULFATE NITRATE, which application is incorporated by reference herein in its entirety.

TECHNICAL FIELD

The present technology relates to the production of ammonium sulfate nitrate (ASN) particles for use in fertilizers.

BACKGROUND

Ammonium sulfate nitrate (ASN), one of the first synthetic fertilizers, has been in continuous use for nearly 100 years providing the important primary and secondary nutrients, nitrogen and sulfur. Nitrogen is provided in part through the nitrate ion, desirable because it is readily absorbed by many plants and promotes early growth.

ASN fertilizers are generally produced by granulation of ammonium sulfate (AS) solids with ammonium nitrate (AN) liquors. Alternatively, ASN fertilizers may be processed as a melt-slurry from either the constituent fertilizers (ammonium nitrate and ammonium sulfate) or, alternatively, from the reaction products of sulfuric/nitric acids with anhydrous ammonia. There are several alternatives for converting the melt-slurry into solid fertilizer particles with the physical properties desired by various markets.

Prilling is a process in which a liquid melt is gently streamed from the top of a tall structure with counter-current cooling air. Surface tension divides the stream into individual droplets which solidify before reaching the tower bottom. An illustrative example of prilling may be found in U.S. Pat. No. 7,175,684, which is incorporated by reference herein.

Pastillation is similar to prilling in that the melt is converted to a droplet and then solidified. However, it differs from prilling in two distinct aspects. First, rather than relying on surface tension to size the droplets, the droplets are portioned mechanically thus achieving very high uniformity in size. Second, rather than dropping the droplet through cooling air, the droplet is applied to a water-cooled metal belt. The heat is removed through the belt and solidified particles fall off the belt at its end. An illustrative example of pastillation may be found in U.S. Pat. No. 7,985,393, which is incorporated by reference herein.

In one type of granulation process, a melt-slurry is sprayed onto a moving bed of granules. The melt-slurry both coats and agglomerates bed granules to increase in size. In some embodiments, the granules are discharged to a dryer drum which, if included, provides additional rolling time for the granules. The granules pass to a screening operation where the product cut is recovered and the under-sized and over-sized material is recycled back to the granulation drum.

It was previously disclosed in U.S. Pat. No. 6,689,181, which is incorporated herein by reference in its entirety, that ammonium sulfate and ammonium nitrate form double-salt compounds during production, including a 3:1 AN to AS double salt (known as a 3:1 double salt) and a 2:1 AN to AS double salt (known as a 2:1 double salt). The '181 patent recognized the benefit of the 2:1 double salt as being a more stable compound. Additional examples of methods of producing 2:1 double salts are provided in U.S. Patent Publication No. 2010/0047149, which is also incorporated by reference herein.

SUMMARY

Embodiments of the invention include systems and methods of producing solid ammonium sulfate nitrate that result in the 2:1 ammonium sulfate nitrate double salt being the dominant salt. In some embodiments, the solid ammonium sulfate nitrate is formed to have a water content of between 0.4 weight percent (wt. %) and 2.0 wt. %, more particularly, 0.4 wt. % to 1.5 wt. %, even more particularly, 0.5 wt. % to 1.5 wt. %.

In some embodiments, the disclosure pertains to a method of producing a solid ammonium sulfate nitrate product. A melt slurry including ammonium sulfate and ammonium nitrate is solidified in a granulation bed of a granulation device having an operating temperature of 90° C. to 120° C. The melt slurry is solidified in the granulation bed of the granulation device to form ammonium sulfate nitrate granules including ammonium sulfate nitrate 2:1 double salt and having a moisture content between 0.4 and 2.0 wt. %.

In some embodiments, the disclosure pertains to a method of producing an ammonium sulfate nitrate product including ammonium sulfate nitrate 2:1 double salt. A melt slurry including ammonium sulfate and ammonium nitrate is added to a solidification device. An amount of supplemental ammonia is added to the solidification device in addition to ammonia provided in the melt slurry, and the melt slurry is solidified in the solidification device in the presence of the supplemental ammonia to form a solid including ammonium sulfate nitrate 2:1 double salt.

In some embodiments, the disclosure pertains to a method of producing an ammonium sulfate nitrate product including ammonium sulfate nitrate 2:1 double salt. A melt slurry including ammonium sulfate and ammonium nitrate is added to a granulation bed of a granulation device and the melt slurry is solidified in the granulation bed to form a solid mixture including ammonium sulfate nitrate 2:1 double salt. The solid mixture is conveyed to a drying device and is at least partially dried in the drying device. During drying, a moisture content of the solid mixture in the drying device is controlled to between 0.4 and 2.0 wt. %.

In some embodiments, the disclosure pertains to a method of producing an ammonium sulfate nitrate product including ammonium sulfate nitrate 2:1 double salt. A melt slurry including ammonium sulfate and ammonium nitrate is added to a solidification device and is solidified in the solidification device to form a solid ammonium sulfate nitrate including ammonium sulfate nitrate 2:1 double salt. Solidification is controlled to achieve a moisture content in the solid mixture of 0.4 to 1.5 wt. %.

BRIEF DESCRIPTION OF THE FIGURES

Specific examples have been chosen for purposes of illustration and description, and are shown in the accompanying drawings, forming a part of the specification.

DETAILED DESCRIPTION

The present invention provides systems and methods for producing solid ASN compositions that are primarily in the form of the ASN 2:1 double salt. More particularly, the present invention provides systems and methods for controlling the water content of ASN particles (e.g., granules) during and after production to maximize the presence of the ASN 2:1 double salt relative to the ASN 3:1 double salt.

The term "double salt" as used herein means a chemical compound composed of ions from two precursor compounds whose crystal structure is distinct from those of the precursor compounds. The molar ratio of precursor compounds in a double salt is in the proportion of small integers, e.g., 1:2, and is not continuously variable as in a solid solution.

The composite product of the invention consists of small ammonium sulfate crystals imbedded in a matrix of the other constituents. The composite material of the invention is to be distinguished from a mixture of free particles. The bulk of the ammonium sulfate crystals are approximately the same size as the initial ammonium sulfate particles, but upon solidification about 5 wt. % precipitate as crystals of less than about 2 micrometer dimension. The crystals of ammonium sulfate are dispersed in the matrix in a uniform manner. The small size and uniform dispersion of the ammonium sulfate crystals in the 1:2 double salt significantly enhance the stability of the product against detonation hazard.

In some embodiments, less than about 7 wt. % of the product consists of the unreacted and underreacted ammonium nitrate or 1:3 double salt species. In some embodiments, less than about 5 wt. % or even less than about 3 wt. % of the product consists of the unreacted and underreacted ammonium nitrate or 1:3 double salt species. The composites of the invention are useful as fertilizers, have reduced moisture sensitivity, are not considered hazardous materials under Title 49 of the Code of Federal Regulations, "Transportation", Part 172, "Hazardous Materials Table", Oct. 1, 2000, and are not classified as oxidizers under United Nations Recommendations on the Transport of Dangerous Goods, Manual of Tests and Criteria, 1995", "Section 34, Classification Procedures, Test Methods and Criteria Relating to Oxidizing Substances of Division 5.1".

In one embodiment, water content is controlled such that the resulting solid ASN composition has a water content of as low as about 0.4 wt. %, as low as about 0.5 wt. %, or as low as 0.6 wt. % and as high as about 1.5 wt. %, as high as about 1.75 wt. %, or as high as about 2.0 wt. %. In other embodiments, the resulting solid ASN composition has a water content that is within any range defined between any pair of the foregoing values. By controlling the water content within these ranges, ASN 2:1 double salt conversion is maximized while still maintaining the structural integrity (e.g., crush strength) of the resulting material. As used herein, water content refers to the average water content of a sample of solid ASN material, as determined via conventional gravimetric analysis, taken during or shortly after production as indicated.

Although the embodiments discussed below pertain primarily to solid ASN materials produced by granulation, similar moisture control techniques could be applied to prilling or pastillation processes to achieve the same water content control. As used herein, the term "solidification device" encompasses any type of device in which a melt slurry may be solidified, with non-limiting examples of solidification devices including granulation devices, prilling devices, and pastillation devices.

Figure 1:
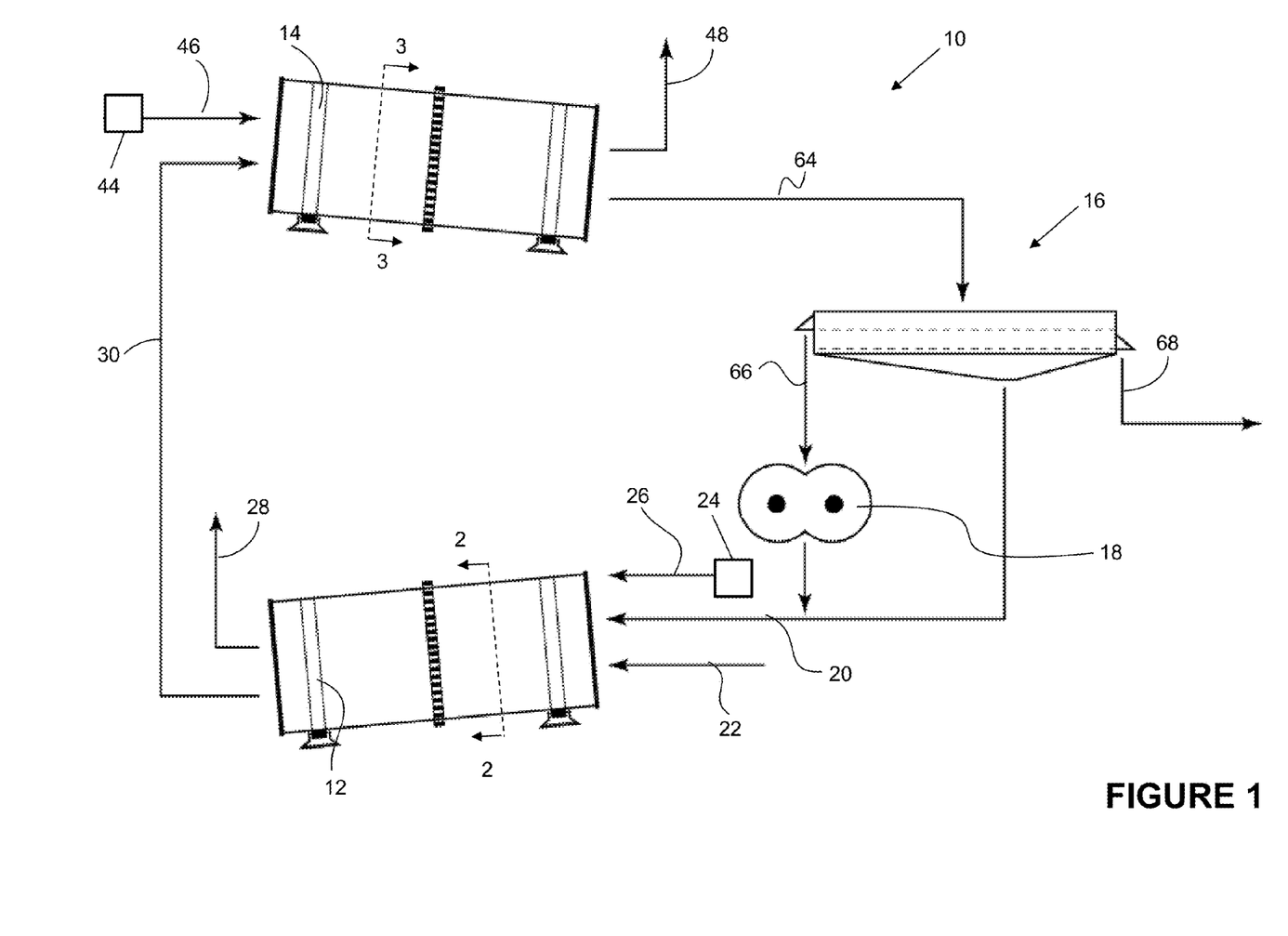
FIG. 1 is a schematic illustration of a granulation process.

FIG. 1 provides a schematic view of an illustrative but non-limiting embodiment of a granulation configuration 10. As illustrated, the granulation configuration 10 includes a granulation drum 12, a dryer/cooler drum 14, a screener 16 and a crusher 18. The granulation configuration 10 is configured as a loop in order to recycle off-specification (i.e., oversized and/or undersized) material back to the granulation drum 12 until it is brought into target specifications. It will be appreciated that granulation configurations can include a variety of different equipment types, configurations, sizes and operating parameters.

Granulation Drum 12

The granulation drum 12 includes an inlet 20 that provides recycled material from the crusher 18 and the screener 16. A melt/solution spray inlet 22 provides the granulation drum 12 with a source of fresh melt-slurry as well as one or more of a water source, a steam source and an ammonia source. An air source 24 provides temperature and/or humidity controlled air at a desired flow rate via an air inlet 26 in order to selectively modify a rate of air flow through the granulation bed. Air is vented from the granulation drum 12 via a vent 28. An outlet 30 transports product to the drying drum 14.

Figure 2:
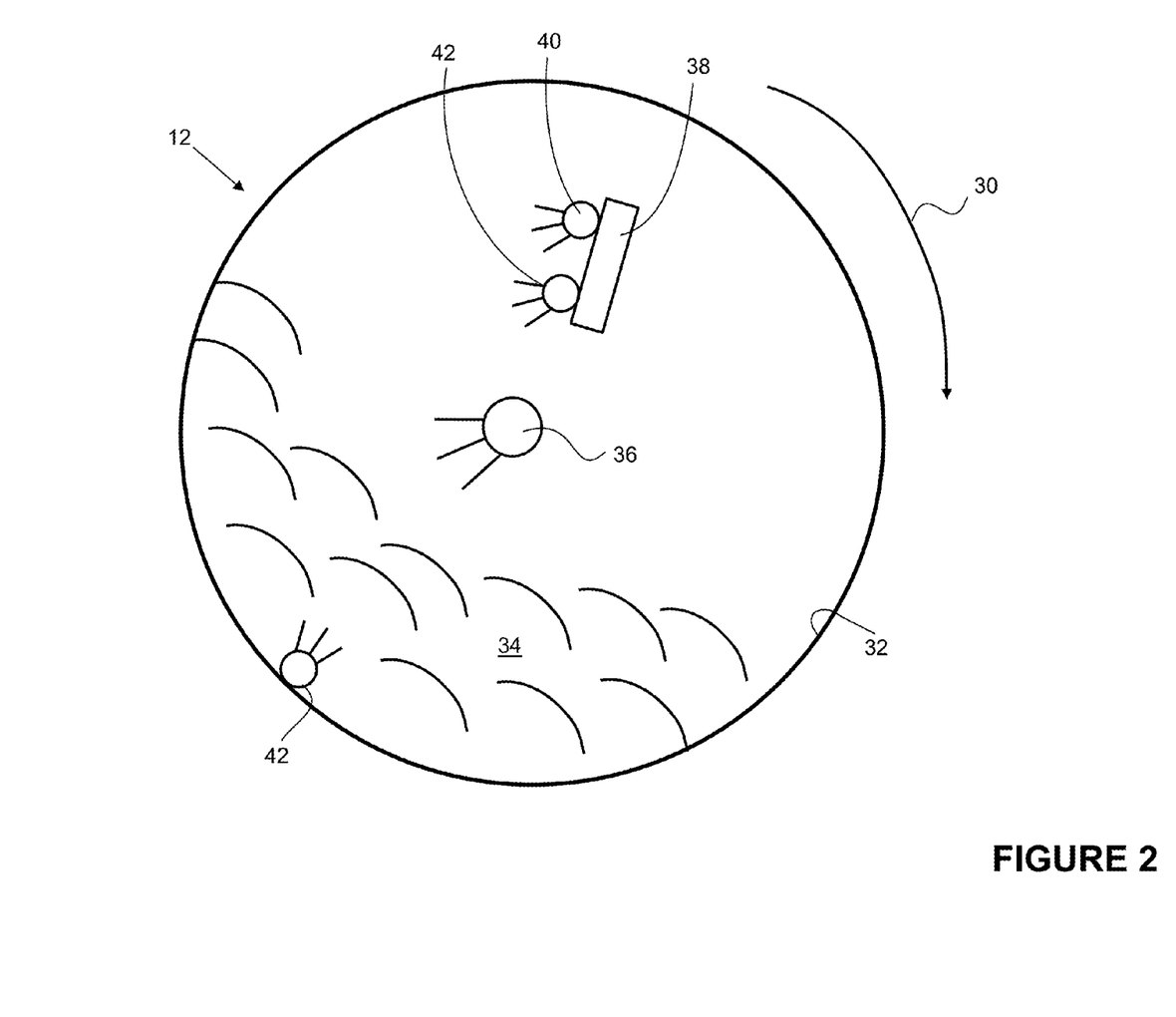
FIG. 2 is a cross-section of a granulation drum useful in an embodiment of the granulation process of FIG. 1.

FIG. 2 is a cross-sectional view of the granulation drum 12, taken along line 2-2 of FIG. 1, illustrating internal components of the granulation drum 12. In the illustrated orientation, the granulation drum 12 rotates in a direction indicated by an arrow 30. The granulation drum 12 has an inner surface 32 and contains a quantity of granules 34.

The granulation drum 12 includes one or more melt-slurry spray nozzles 36 that are arranged and configured to spray the granules 34 with fresh melt-slurry. While a single melt-slurry spray nozzle 36 is illustrated, it will be appreciated that in some embodiments a plurality of nozzles 36 may be used. A bank 38 of spray nozzles, in addition to the melt-slurry nozzles 36, may, as illustrated, include one or more solution spray nozzles 40 that may be configured to spray liquid water or fertilizer solution recycled or recovered from other plant operations, as desired, onto the granules 34. In some embodiments, additional ammonia can be added to adjust the pH either by adding ammonia alone or in combination with one or more of water of fertilizer solution. In some embodiments, the bank 38 includes one or more steam injection nozzles 42 that may be configured to inject steam into the granulation drum 12.

In some embodiments, the melt slurry is formed by combining particles of ammonium nitrate and ammonium sulfate in the presence of a small amount of water, and heating to a temperature sufficient to melt the ammonium nitrate and mixing thoroughly to disperse the solid ammonium sulfate. In some embodiments, the molar ratio of ammonium sulfate to ammonium nitrate is about 0.9:1 to 1.1:1. The particle size of the ammonium nitrate is not critical but in some embodiments, about 95 wt. % of the ammonium nitrate particles pass a Tyler No. 6 sieve (3.36 mm opening). With respect to the ammonium sulfate, the smaller the particle, the more rapid the reaction between the ammonium sulfate and ammonium nitrate and the finer will be the scale of their dispersion. In some embodiments, the ammonium sulfate is at least about 85 wt. % passable through a Tyler No. 48 sieve (0.30 mm opening). Ammonium sulfate subjected to commercial ball milling typically meets this criterion without additional screening. In some embodiments, the ammonium sulfate is about 99 wt. % passable through a Tyler No. 48 sieve. In other embodiments, the ammonium sulfate is about 99 wt. % passable through a Tyler No. 48 sieve and about 50 wt. % passable through a Tyler No. 200 sieve (0.074 mm opening).

In one embodiment, the granulation drum 12 is operated to produce granules having a water content of as low as about 0.4 wt. %, as low as about 0.5 wt. %, or as low as about 0.6 wt. % and as high as about 1.5 wt. %, as high as about 1.75 wt. %, or as high as about 2.0 wt. %. In other embodiments, the resulting solid ASN composition has a water content that is within any range defined between any pair of the foregoing values. In some embodiments, the granule bed is maintained at a temperature as low as about 90° C. or as low as about 95° C. and as high as about 105° C. or as high as about 120° C. In other embodiments, the granule bed is maintained at a temperature that is within any range defined between any pair of the foregoing values. These temperatures are significantly below the melting temperature of the ASN material. In some embodiments, the temperature of the granulation bed is determined using a temperature sensing probe having an active element submerged in the moving solids. In contrast, conventional granulation processes operate at a bed temperature of 140-160° C., which is much closer to the melting temperature of the ASN material resulting in production of granules with a water content generally below 0.4 wt. %.

To account for the cooling duty to solidify the melt-slurry, embodiments of the present invention control the water, air and steam that is sprayed/injected onto the granule bed to control the moisture content while still maintaining desirable physical properties of the resulting ASN material including crush strength. Generally speaking, when compared to conventional operating parameters, embodiments of the present invention utilize reduced air flow, but increased water spray and/or steam injection in order to achieve heat removal to solidify the melt-slurry.

In another embodiment, additional ammonia is added to the granulation drum 12, either through the spray bank 38 or in any other acceptable manner. In some embodiments, additional ammonia is added in order to adjust the pH upwards towards the product pH such that the pH at the moment of discharge from the granulation bed is substantially the same as the normal product pH. As further set forth in the Examples, the ammonia raises the pH of the solid ASN material, which may facilitate the more rapid and complete conversion of the ammonium sulfate nitrate 3:1 double salt to the ammonium sulfate nitrate 2:1 double salt.

Drying Drum 14

Returning to FIG. 1, the drying device or drying drum 14 allows for further control of the moisture content of granules 54. Product from the granulation drum 12 enters the dryer drum 14 via the outlet 30. A source of temperature and/or humidity controlled air 44 enters the dryer drum 14 via an air inlet 46 in order to selectively modify a rate of air flow through the drying device. A vent 48 permits exhaust air to exit the dryer drum 14. In some embodiments, the dryer drum 14 may include a spray bank 58 that includes one or more solution spray nozzles 60 that may be configured to spray ammonia onto the granules 54, if desired.

Figure 3:
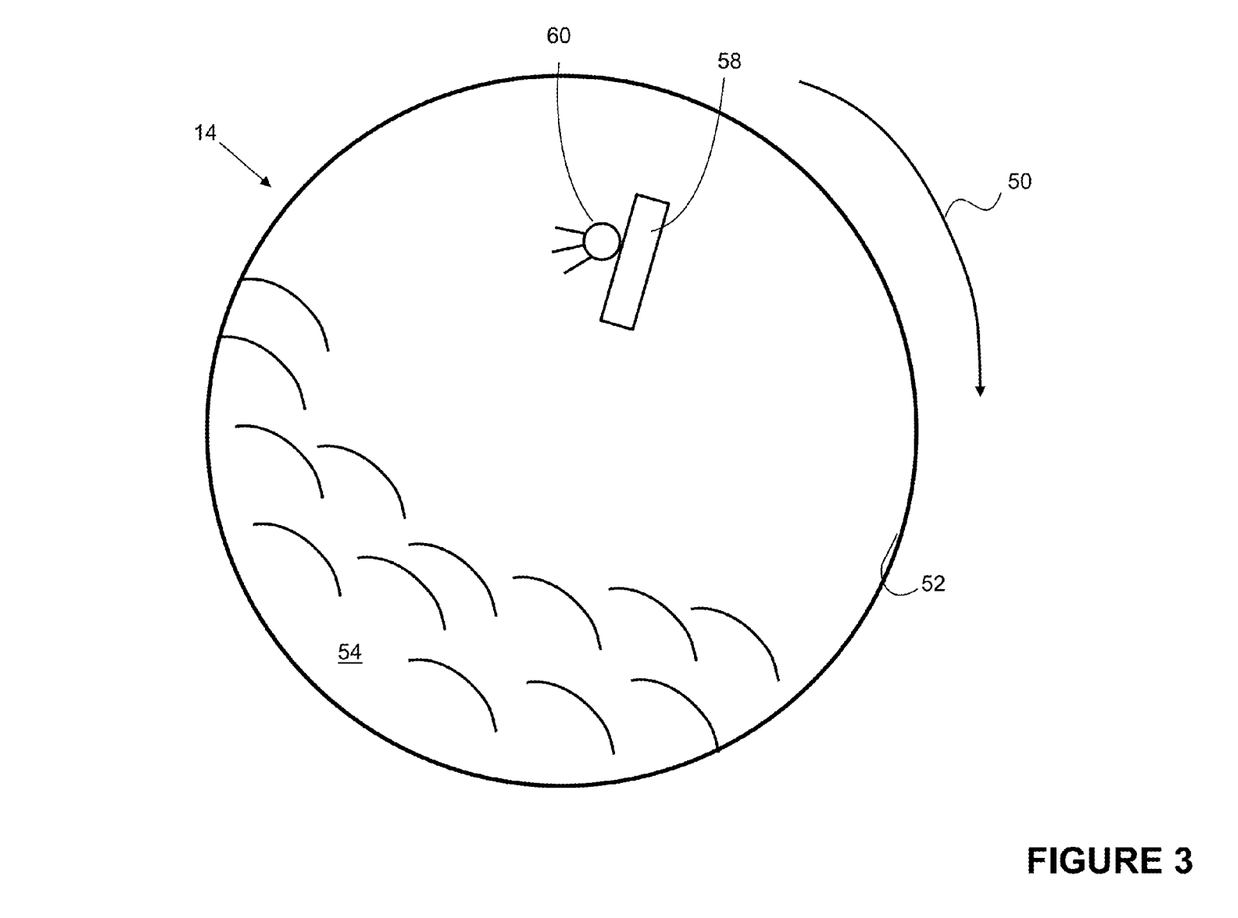
FIG. 3 is a cross-section of a drying drum useful in an embodiment of the granulation process of FIG. 2.

FIG. 3 is a cross-sectional view of the dryer drum 14, taken along line 3-3 of FIG. 1, illustrating internal components of the dryer drum 14. In the illustrated orientation, the dryer drum 14 rotates in a direction indicated by an arrow 50. The dryer drum 14 has an inner surface 52 and contains a quantity of granules 54.

Similar to the granulation drum 12, the dryer drum 14 may be operated to provide a discharge moisture content, i.e., the moisture content of the granules upon discharge from the dryer drum 14, of as low as about 0.4 wt. %, as low as about 0.5 wt. %, as low as about 0.6 wt. % and as high as about 0.8 wt. %, as high as about 1.0 wt. % or as high as about 1.5 wt. %. In other embodiments, the discharge moisture content is within any range defined between any pair of the foregoing values. It will be appreciated that the manner in which the dryer drum 14 is operated is impacted by the manner in which the granulation drum 12 is operated.

Screener 16/Crusher 18

Once the solid ASN material exits the dryer drum 14 via an outlet 64, it travels to the screener 16. The screener 16 separates material that meets specification and delivers it via an outlet 68 to a finishing system (not illustrated) where final drying, cooling and coating is accomplished. In some embodiments, desired particle sizes, depending on geographic market and end-use application, can vary from about 2 millimeters (mm) to about 3 mm. In some embodiments, undersized material is passed back to the granulation drum 12 via an outlet 66 so that it may continue to increase in size when subjected again to the granulation process. In some embodiments, as illustrated, oversized material is passed to the crusher 18. Breaking down the oversized material both recycles the material through the loop to become properly sized but also, more importantly, provides a population of fine particles to seed future granules.

By balancing the moisture content and physical properties of the solid ASN material, increased amounts of the solid ASN material meet size specification and are removed from the granulation loop. This is beneficial not only for efficiency, but also because recycled granules tend to cause increased variability in the moisture content and or physical properties of the solid ASN material. In some embodiments, maintaining a consistent moisture profile around the granulation loop reduces or eliminates over-drying. Over-wetting is also reduced or eliminated as there is then no need to re-wet the over-dried granules. In some embodiments, controlling the moisture content can improve the morphology of the granules. In some embodiments, substantially spherical granules may be obtained.

For example, fines can be generated in the granulation loop due to a number of reasons. The new granules can become too wet, resulting in increased crumbling going into the dryer 14. Variations in granule microstructure can result in a greater yield of fines when oversize is passed through the crusher 18. Variations in granulation behavior can increase the amount of oversize, resulting in more fines. Regardless, the consequence of an increased quantity of fines is a larger population of smaller sized granules.

Example 1

During testing, it was found that granules taken fresh from the granulator were very acidic in nature (having a pH, when in water, of less than 4.0), although the pH would recover overnight towards typical values around a pH of 5.2. When fresh product was bagged, condensation occurred and was found to be very acidic. Accordingly, experiments were conducted to determine the extent to which ammonia was lost during thermal processing of mixing the melt-slurry and/or the subsequent granulation process. Experiments have shown a clear loss of ammonia relative to the nitrate and sulfate consistent with the observed pH shift. The subsequent overnight recovery of the pH and the acidic condensation from the granules further suggest that the granules subsequently lose acid to bring the pH back into equilibrium.

It will be appreciated that if ammonia loss creates an accumulation of sulfuric acid in the granules, there may be potential implications for the available moisture because sulfuric acid is a powerful drying agent. Thus, the addition/creation of sulfuric acid, such as via the loss of nitric acid, to the nearly dry granules may bind water and inhibit its ability to facilitate the conversion of 3:1 and AS into the 2:1 double-salt. Indeed, it was found in laboratory experiments that the addition of sulfuric acid (to mimic over-acidification in lieu of inducing ammonia loss) provided "slowed" 2:1 conversion kinetics. Otherwise, very rapid conversion would be routinely achieved.

Example 2

Figure 4:
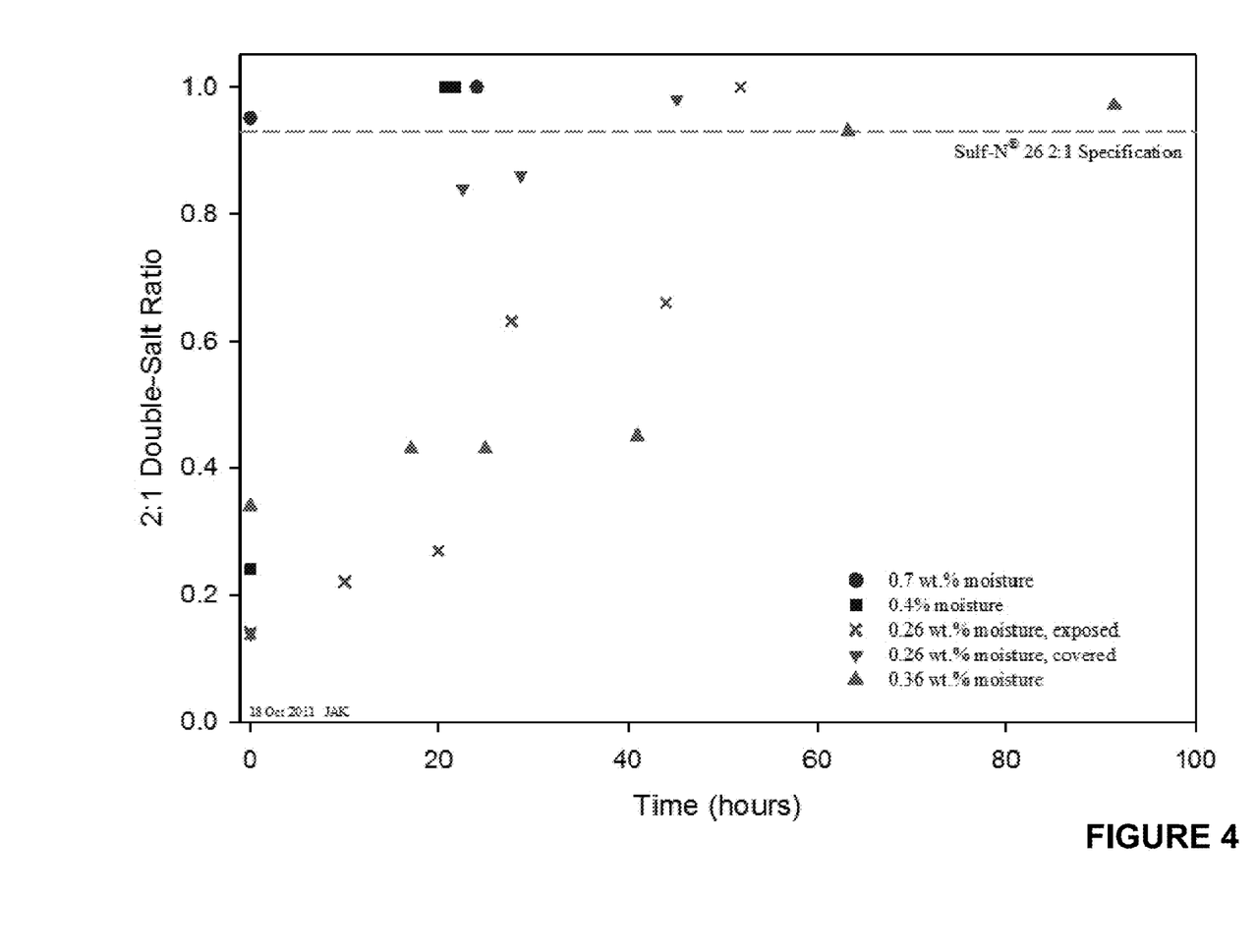
FIG. 4 is a graphical representation of experimental data.

Presented in FIG. 4 is kinetic data for the post-solidification conversion of 3:1 ASN double-salt into the 2:1 ASN double salt form. FIG. 4 presents a number of experiments conducted where a melt-slurry was prepared with different amounts of moisture and with a small amount ($1 \times 10^{-6}$ equivalent/gram) of sulfuric acid to retard 2:1 kinetics. The samples were then subjected to sequential X-ray diffraction (XRD) analysis to measure 3:1 double-salt. The results are presented as a ratio of 2:1 to 3:1.

As can be seen in FIG. 4, solid moistures of 0.4 wt. % or greater resulted in very rapid conversion. Moisture even at 0.26 wt. % resulted in complete 2:1 conversion within 2-3 days. This demonstrates that the loss of ammonia can limit the conversion of the 3:1 double salt into the 2:1 double salt. Accordingly, in some embodiments, small amounts of supplemental ammonia may be added to the granules 34 within the granulation drum 12 via the solution spray nozzles 40. In some instances, it may be beneficial to additionally or instead add small amounts of supplemental ammonia to the granules 54 within the dryer drum 14 in order to facilitate full conversion to the 2:1 double salt.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

We claim:

1. A method of producing a solid ammonium sulfate nitrate composition comprising the step of:
   solidifying a melt slurry including ammonium sulfate and ammonium nitrate in a granulation bed to form the solid ammonium sulfate nitrate composition comprising ammonium sulfate nitrate 2:1 double salt, wherein the melt slurry has a molar ratio of ammonium sulfate to ammonium nitrate of about 0.9:1 to about 1.1:1, wherein the granulation bed has an operating temperature of 90° C. to 120° C. and the solid ammonium sulfate nitrate composition has a moisture content of between 0.4 wt. % and 2.0 wt. % wherein the solid ammonium sulfate nitrate composition is primarily in the form of the ammonium sulfate nitrate 2:1 double salt and includes less than about 7 wt. % of unreacted ammonium nitrate and ammonium sulfate nitrate 3:1 double salt.

2. The method of claim 1, wherein the granulation bed has an operating temperature of 90° C. to 105° C.

3. The method of claim 1, wherein said solidifying step further comprises adding steam to the granulation bed.

4. The method of claim 1, wherein said solidifying step further comprises spraying an aqueous solution onto the granulation bed.

5. The method of claim 1, wherein said solidifying step further comprises selectively modifying a rate of air flow through the granulation bed.

6. The method of claim 1, wherein said solidifying step further comprises:
   adding steam to the granulation bed; and
   selectively modifying a rate of air flow through the granulation bed.

7. A method of producing a solid ammonium sulfate nitrate composition including ammonium sulfate nitrate 2:1 double salt, said method comprising the steps of:
   adding a melt slurry including ammonium sulfate and ammonium nitrate to a granulation device, wherein the melt slurry has a molar ratio of ammonium sulfate to ammonium nitrate of about 0.9:1 to about 1.1:1;
   adding an amount of supplemental ammonia to the granulation device in addition to ammonia provided in the melt slurry;
   solidifying the melt slurry in the granulation device in the presence of the supplemental ammonia to form a solid granule mixture including ammonium sulfate nitrate 2:1 double salt, wherein the solid ammonium sulfate nitrate composition is primarily in the form of the ammonium sulfate nitrate 2:1 double salt and includes less than about 7 wt. % of unreacted ammonium nitrate and ammonium sulfate nitrate 3:1 double salt.

8. The method of claim 7, wherein said adding steps further comprise, respectively:
   adding the melt slurry to a material bed of the granulation device; and
   adding the supplemental ammonia to the material bed of the granulation device.

9. The method of claim 7, wherein the solidification device is a granulation device, and said adding step further comprises:
   adding the supplemental ammonia to a material bed of a drying device downstream of the granulation device.

10. A method of producing a solid ammonium sulfate nitrate composition, said method comprising the steps of:
    adding a melt slurry including ammonium sulfate and ammonium nitrate to a granulation bed of a granulation device wherein the melt slurry has a molar ratio of ammonium sulfate to ammonium nitrate of about 0.9:1 to about 1.1:1;
    solidifying the melt slurry in the granulation bed of the granulation device to form the solid ammonium sulfate nitrate composition, including ammonium sulfate nitrate 2:1 double salt;
    drying the solid mixture in a drying device such that a moisture content of the solid ammonium sulfate nitrate composition in the drying device is between 0.4 wt. % and 1.5 wt. %, wherein the solid ammonium sulfate nitrate composition is primarily in the form of the ammonium sulfate nitrate 2:1 double salt and include less than about 7 wt. % of unreacted ammonium nitrate and ammonium sulfate nitrate 3:1 double salt.

11. The method of claim 10, wherein said controlling step further comprises selectively modifying a rate of air flow through the drying device.

12. A method of producing a solid ammonium sulfate nitrate composition including ammonium sulfate nitrate 2:1 double salt, said method comprising the steps of:
    solidifying a melt slurry including ammonium sulfate and ammonium nitrate in a granulation device to form solid ammonium sulfate nitrate granules including ammonium sulfate nitrate 2:1 double salt, wherein the melt slurry has a molar ratio of ammonium sulfate to ammonium nitrate of about 0.9:1 to about 1.1:1, wherein the solid ammonium sulfate nitrate has a moisture content of 0.4 to 2.0 wt. %, wherein the solid ammonium sulfate nitrate granules include less than about 7 wt. % of unreacted ammonium nitrate and ammonium sulfate nitrate 3:1 double salt.

13. The method of claim 12, wherein the solid ammonium sulfate nitrate has a moisture content between 0.5 and 1.5 wt. %.

14. The method of claim 1, wherein the solid ammonium sulfate nitrate composition includes less than about 3 wt. % of ammonium nitrate and ammonium sulfate nitrate 3:1 double salt.

15. The method of claim 12, wherein the solid ammonium sulfate nitrate granules include less than about 3 wt. % of unreacted ammonium nitrate and ammonium sulfate nitrate 3:1 double salt.

16. The method of claim 1, wherein the granulation bed has an operating temperature of 90° C. to 105° C., the solid ammonium sulfate nitrate composition has a moisture content between 0.5 wt. % and 2.0 wt. %, and the solid ammonium sulfate nitrate composition includes less than about 3 wt. % of unreacted ammonium nitrate and ammonium sulfate nitrate double salt.

17. The method of claim 7, wherein the amount of supplemental ammonium is sufficient to raise a pH of the solid ammonium sulfate nitrate composition exiting the granulation bed to a pH of about 5.2.

* * * * *